(12) United States Patent
Shima et al.

(10) Patent No.: US 11,190,426 B2
(45) Date of Patent: Nov. 30, 2021

(54) NETWORK EVALUATING APPARATUS, NETWORK EVALUATING METHOD, AND PROGRAM

(71) Applicant: Sony Interactive Entertainment Inc., Tokyo (JP)

(72) Inventors: Koji Shima, Kanagawa (JP); Makoto Ikushima, Kanagawa (JP); Kenjiro Komaki, Saitama (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/580,395

(22) Filed: Sep. 24, 2019

(65) Prior Publication Data

US 2020/0120007 A1   Apr. 16, 2020

(30) Foreign Application Priority Data

Oct. 11, 2018   (JP) .............................. JP2018-192456

(51) Int. Cl.
| H04L 12/26 | (2006.01) |
| H04L 29/06 | (2006.01) |
| H04L 5/00 | (2006.01) |

(52) U.S. Cl.
CPC .......... H04L 43/0829 (2013.01); H04L 69/22 (2013.01); *H04L 5/0055* (2013.01)

(58) Field of Classification Search
CPC .... H04L 43/0829; H04L 69/22; H04L 5/0055
See application file for complete search history.

(56) References Cited

U.S. PATENT DOCUMENTS

| 10,509,764 B1* | 12/2019 | Izenberg .............. G06F 15/167 |
| 2009/0303892 A1 | 12/2009 | Yamasaki |
| 2012/0272309 A1* | 10/2012 | Zhang ................ H04L 63/0227 726/13 |
| 2015/0016294 A1* | 1/2015 | Hegge .................. H04L 45/245 370/252 |
| 2015/0117357 A1* | 4/2015 | Ozturk ................ H04W 24/10 370/329 |

(Continued)

FOREIGN PATENT DOCUMENTS

| CN | 107431638 A | 12/2017 |
| JP | 2008-219127 A | 9/2008 |

(Continued)

OTHER PUBLICATIONS

Japanese Office Action dated Sep. 1, 2020, for the Corresponding Japanese Patent Application No. 2018-192456.

*Primary Examiner* — Ajay Cattungal
(74) *Attorney, Agent, or Firm* — Katten Muchin Rosenman LLP

(57) ABSTRACT

Disclosed herein is a network evaluating apparatus including: an acquisition section acquiring a plurality of packets each of which includes an identification value indicating an order in accordance with which data is transmitted from a transmission source, the plurality of packets being received one by one; and an evaluation section, in a case where the identification value included in a first packet as any one of the plurality of received packets indicates that the first packet is transmitted before a second packet received before the first packet, increasing an evaluation value indicating instability of a transmission and reception path.

8 Claims, 13 Drawing Sheets

(56) References Cited

U.S. PATENT DOCUMENTS

| | | | |
|---|---|---|---|
| 2017/0085618 A1* | 3/2017 | Titus | H04L 65/80 |
| 2018/0097720 A1* | 4/2018 | Jaffer | H04L 45/70 |
| 2019/0158371 A1* | 5/2019 | Dillon | H04L 43/087 |
| 2020/0213041 A1* | 7/2020 | Chen | H04L 1/1809 |
| 2020/0304608 A1* | 9/2020 | Su | H04L 12/4633 |

FOREIGN PATENT DOCUMENTS

| | | |
|---|---|---|
| JP | 2009-081737 A | 4/2009 |
| JP | 2018-504050 A | 2/2018 |
| WO | 2008/004616 A1 | 10/2008 |
| WO | 2016/119822 A1 | 4/2016 |

* cited by examiner

F I G . 1
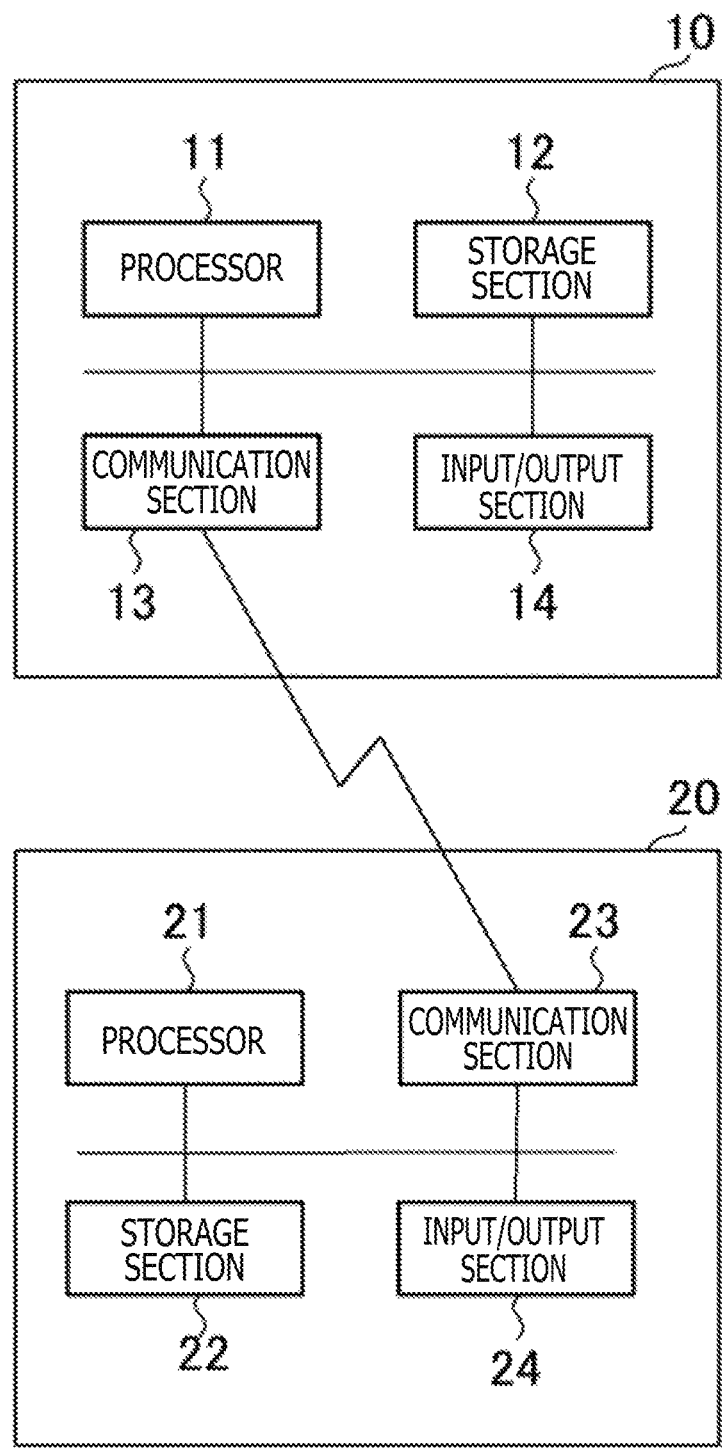

FIG. 8

| 1<br>-1024 | 1025<br>-2048 | 2049<br>-3072 | ... | 4097<br>-5120 | 5121<br>-6144 | ... | 7169<br>-8192 | 8193<br>-9216 | ◀ TB : 9216 |

| 1 | 1025 | 2049 | | 4097 | 5121 | | 7169 | 8193 |
|---|---|---|---|---|---|---|---|---|
| -1024 | -2048 | -3072 | | -5120 | -6144 | | -8192 | -9216 |

PR — 5121 / -6144

NETWORK EVALUATING APPARATUS, NETWORK EVALUATING METHOD, AND PROGRAM

BACKGROUND

The present disclosure relates to a network evaluating apparatus, a network evaluating method, and a program.

In a local area network (LAN), the Internet or the like, for example, a communication protocol like a transmission control protocol (TCP) is used. In the communication protocol such as the TCP, a packet obtained by dividing data is transmitted via a communication path. For example, for the purpose of evaluating stability in the communication between a server and a client, there is known a method of acquiring a packet of communication by packet capture, and calculating a packet loss rate.

SUMMARY

For calculating the packet loss rate, it is necessary to detect whether or not there is a packet loss. In order to attain this, it is necessary to find out a packet which is transmitted, but is not received. Thus, it is not easy to measure the packet loss rate in the communication path between an apparatus on a transmission side and an apparatus on a reception side.

The present disclosure has been made in the light of the problem described above, and it is desirable to provide a technology for more easily evaluating stability of a network in a communication path.

According to an embodiment of the present disclosure, a network evaluating apparatus includes: an acquisition section acquiring a plurality of packets each of which includes an identification value indicating an order in accordance with which data is transmitted from a transmission source, the plurality of packets being received one by one; and an evaluation section, in a case where the identification value included in a first packet as any one of the plurality of received packets indicates that the first packet is transmitted before a second packet received before the first packet, increasing an evaluation value indicating instability of a transmission and reception path.

According to another embodiment of the present disclosure, a network evaluating method includes: acquiring a plurality of packets each of which includes an identification value indicating an order in accordance with which data is transmitted from a transmission source, the plurality of packets being received one by one; and in a case where the identification value included in a first packet as any one of the plurality of received packets indicates that the first packet is transmitted before a second packet received before the first packet, increasing an evaluation value indicating instability of a transmission and reception path.

According to a further embodiment of the present disclosure, a program for a computer includes: by an acquisition section, acquiring a plurality of packets each of which includes an identification value indicating an order in accordance with which data is transmitted from a transmission source, the plurality of packets being received one by one; and by an evaluation section, in a case where the identification value included in a first packet as any one of the plurality of received packets indicates that the first packet is transmitted before a second packet received before the first packet, increasing an evaluation value indicating instability of a transmission and reception path.

According to the embodiments of the present disclosure, stability of a network in a communication path can be more easily evaluated.

In one embodiment of the present disclosure, the evaluation section may calculate the evaluation value for each connection with the transmission source.

In one embodiment of the present disclosure, the evaluation section, in a case where the connection is ended, may output the evaluation value.

In one embodiment of the present disclosure, the evaluation section, in a case where packets the number of which is larger than a predetermined number are received in the connection, may output the evaluation value.

In one embodiment of the present disclosure, the evaluation section may calculate the evaluation value with respect to a plurality of packets except for a predetermined number of packets from a head among the plurality of packets received in the connection.

In one embodiment of the present disclosure, the second packet may include an identification value indicating that the packet is last in order among the plurality of packets received before the first packet is received, and the evaluation section, in a case where the identification value included in the first packet indicates that the first packet is before the second packet in order, may add a value according to a difference between the identification value of the first packet and the identification value of the second packet to the evaluation value.

BRIEF DESCRIPTION OF THE DRAWINGS

FIG. 1 is a block diagram depicting a hardware configuration of a communication system;

FIG. 8 is a diagram depicting another example of data and a reception packet stored in the buffer;

FIG. 9 is a diagram depicting a further example of data and a reception packet stored in the buffer;

DETAILED DESCRIPTION OF PREFERRED EMBODIMENT

Figure 2:
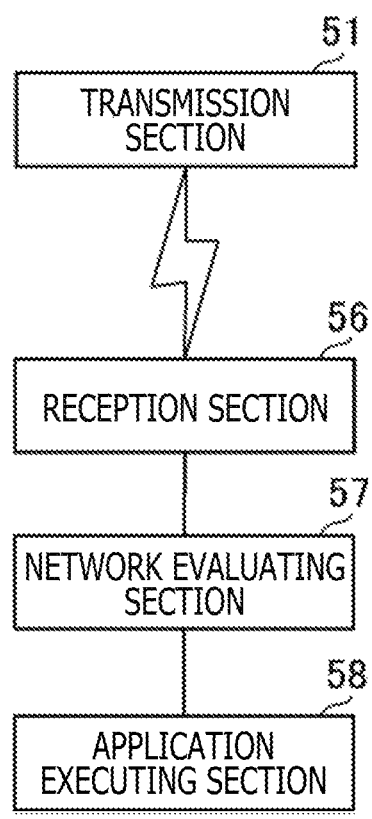
FIG. 2 is a block diagram depicting a function which the communication system realizes.

Hereinafter, an embodiment of the present disclosure will be described on the basis of the drawings. Constituent elements having the same functions of appearing constituent elements are assigned the same reference signs and a description thereof is omitted.

FIG. 1 is a block diagram depicting a hardware configuration of a communication system according to an embodiment of the present disclosure. The communication system according to the present embodiment includes a first apparatus 10 and a second apparatus 20. The first apparatus 10 is a computer including a processor 11, a storage section 12, a communication section 13, and an input/output (I/O) section 14. The second apparatus 20 is a computer including a processor 21, a storage section 22, a communication section 23, and an I/O section 24. For example, the first apparatus 10 may be a server computer, and the second apparatus 20 may be a home-use game machine connected to a LAN within a home.

The processor 11 operates in accordance with a program stored in the storage section 12 and controls the communication section 13 and the I/O section 14. The processor 21 operates in accordance with a program stored in the storage section 22 and controls the communication section 23 and the I/O section 24. The programs described above may be supplied from a storage medium which is readable by a computer, such as a flash memory, or may be provided via a network such as the Internet.

The storage section 12 and the storage section 22 include an external storage device such as a dynamic random access memory (DRAM), a flash memory or a hard disc drive. The storage sections 12 and 22 store the programs described above. In addition, the storage sections 12 and 22 store information or an arithmetic operation result which is inputted from the processors 11 and 21, the communication sections 13 and 23, or the like.

The communication sections 13 and 23 include an integrated circuit, an antenna and the like for communicating with other apparatus. The communication sections 13 and 23 include a connector, a chip and the like for connection to the network. The communication sections 13 and 23 transmit data to other apparatus via a network such as a LAN, and receive data transmitted from other apparatus.

The I/O section 14 includes a circuit acquiring information from an input device such as a keyboard, and a circuit controlling an output device such as an audio outputting device or an image display device. The I/O section 14 acquires an input signal from the input device, and inputs information into which the input signal is converted to the processor 11 or the storage section 12. In addition, the I/O section 14 causes a speaker to output an audio, and causes the display device to output an image based on the control by the processor 11 or the like.

FIG. 2 is a block diagram depicting a function which the communication system realizes. The first apparatus 10 functionally includes a transmission section 51, and the second apparatus 20 functionally includes a reception section 56, a network evaluating section 57, and an application executing section 58. The transmission section 51 is mainly realized by the processor 11 included in the first apparatus 10 executing a program stored in the storage section 12 and controlling the communication section 13. The reception section 56 is mainly realized by the processor 21 included in the second apparatus 20 executing a program stored in the storage section 22 and controlling the communication section 23. The network evaluating section 57 and the application executing section 58 are mainly realized by the processor 21 executing a program stored in the storage section 22 and controlling the I/O section 14 if necessary. It should be noted that only the constituent elements necessary for the description are depicted in FIG. 2, and actually, a constituent element corresponding to the reception section 56 is also present in the first apparatus 10 and a constituent element corresponding to the transmission section 51 is also present in the second apparatus 20.

The transmission section 51 is communication-connected to a specific port of the second apparatus 20, and transmits a plurality of packets P to the communication-connected port. The transmission section 51 divides data a size of which is larger than that of the packet P into a plurality of packets P, and transmits the plurality of resulting packets P. Each of the packets P includes a sequence number as an identification value indicating the order in accordance with which the main body of the data is to be transmitted. The sequence number is given to the packet P which is transmitted for the first time, and the packet P which is retransmitted due to abnormality or the like of the communication includes the sequence number given to the packet P when the packet P of interest was transmitted for the first time.

When the transmitted packet P arrives at the second apparatus 20, an acknowledgement ACK regarding the packet P of interest is transmitted from the second apparatus 20 to the first apparatus 10. The transmission section 51 receives the acknowledgement ACK, and in the case where it is difficult for the transmission section 51 to receive an acknowledgement ACK with respect to any one of the transmitted packets P within a predetermined time, the transmission section 51 transmits the packet P of interest again.

The reception section 56 is communication-connected to the first apparatus 10, and receives a plurality of packets P one by one which are transmitted from the transmission section 51 to the communication-connected port, thereby acquiring the packets P thus received.

In the case where the identification value included in a first packet P as any one of the received packets P indicates that the first packet P has been transmitted before a second packet P received before the first packet P, the network evaluating section 57 increases an evaluation value indicating instability of a transmission/reception path. In addition, the network evaluating section 57 outputs the evaluation value to the application executing section 58 or the storage section 12.

The application executing section 58 executes processing in accordance with the evaluation value outputted from the network evaluating section 57. For example, in the case where the evaluation value regarding certain connection indicates that the network is unstable, the application executing section 58 ends the connection with the first apparatus 10, and establishes a new connection with other apparatus having the same function as that of the first apparatus 10. In addition, the application executing section 58 may transmit the evaluation value to a management server not depicted. The management server may statistically process the transmitted evaluation value and dynamically change the configuration of the network.

Figure 3:
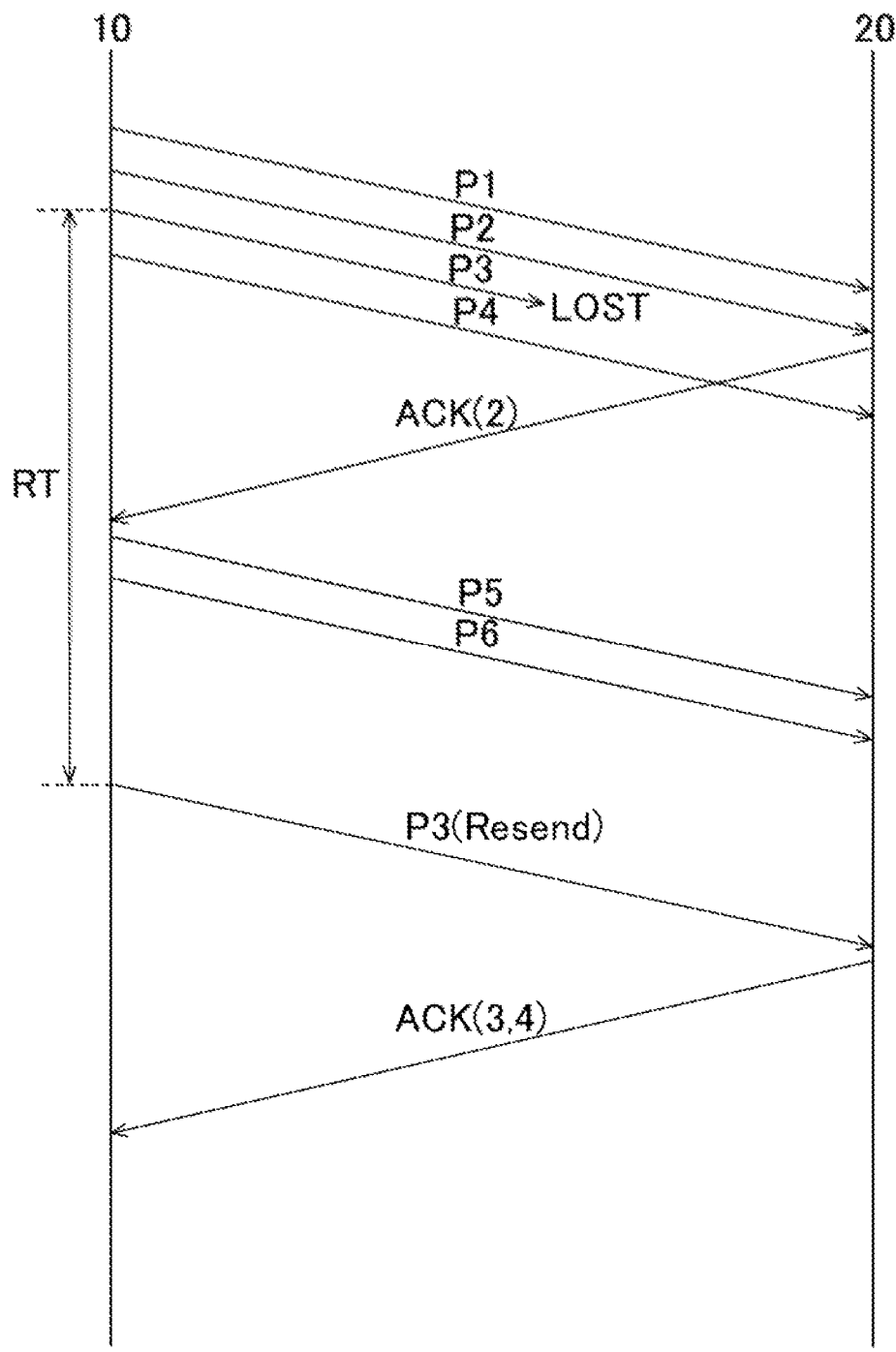
FIG. 3 is a view depicting an outline of communication.

FIG. 3 is a view depicting an outline of communication between the first apparatus 10 and the second apparatus 20. The transmission section 51 transmits packets P1 to P4 each falling within a transmission area of a previously determined data amount (window size) in order. It is assumed that the packets P1, P2, and P4 are received by the second apparatus 20, and the packet P3 is lost on the communication path due to instability of communication.

When the second apparatus 20 transmits an acknowledgement ACK (2) regarding the packets P1 and P2, and the transmission section 51 receives the acknowledgement ACK (2), the transmission section 51 excludes the packets P1 and P2 from the transmission area, and transmits new packets P5 and P6 which can be caused to fall within the transmission area because of the exclusion. On the other hand, the transmission section 51 detects the packet P3 for which the acknowledgement ACK is not yet received even after a retransmission time-out RT elapses from the transmission, and retransmits the detected packet P3. Although not depicted, also in the case the packets P5 and P6 are received, the second apparatus 20 transmits the acknowledgement ACK (2) indicating the effect that packets up to the packet P2 have been normally received. Therefore, in the case where the same acknowledgement ACK is received predetermined times, the transmission section 51 may retransmit the packet P3 following the packet P2 which is indicated by the acknowledgement ACK (2) and has been normally received.

Referring to FIG. 3, if the retransmission occurs, the second apparatus 20 receives the packet P3 later than the packet P6, and the transmission order is different from the original transmission order. In addition, if the communication becomes unstable due to the congestion of the communication or the like, the order of reception of packets P is changed by an operation of a router in some cases. Hereinafter, a description will be given with respect to a technology for evaluating the stability of communication by utilizing this phenomenon.

Figure 4:
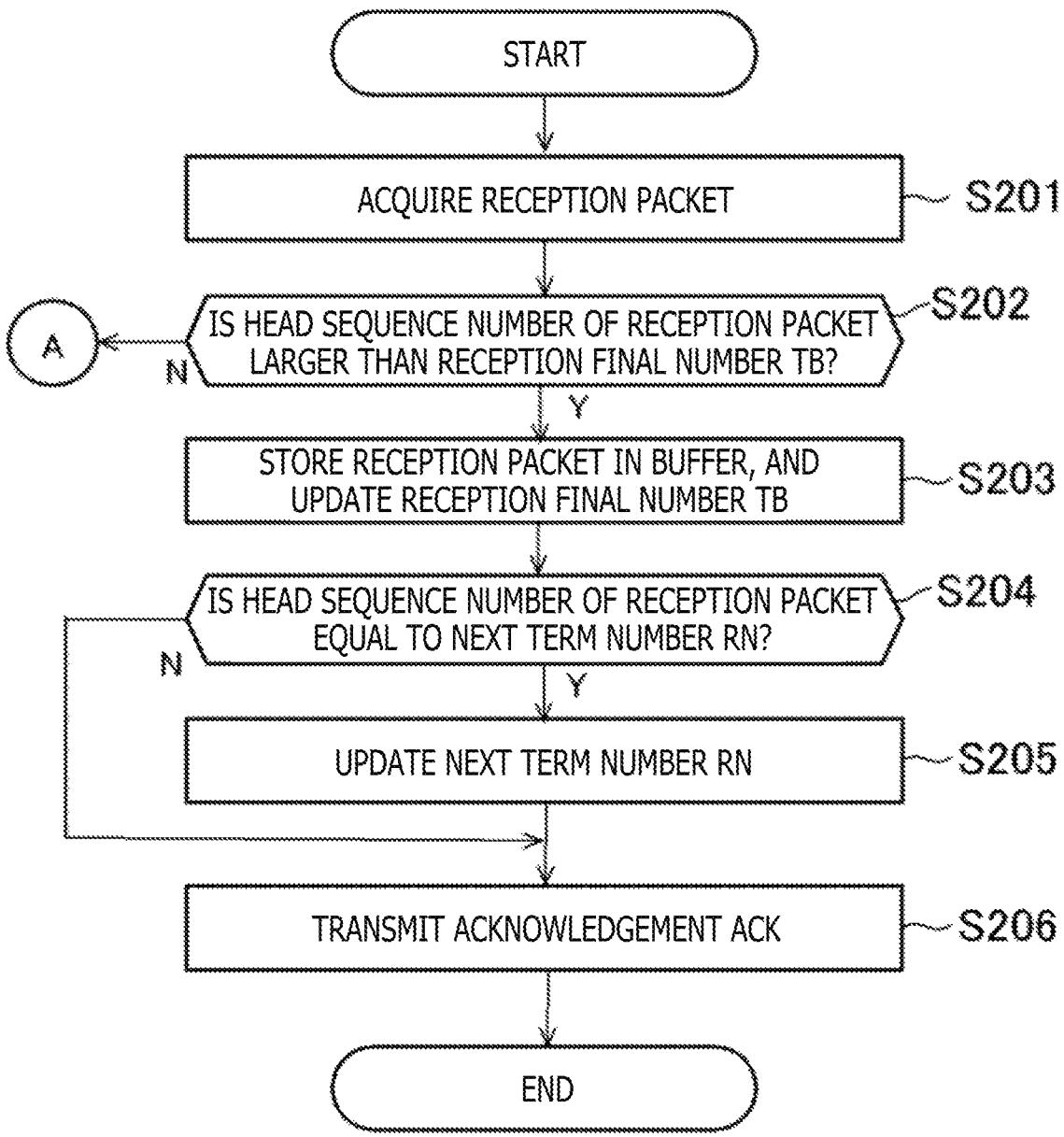
FIG. 4 is a flow chart depicting an example of reception processing.
Figure 5:
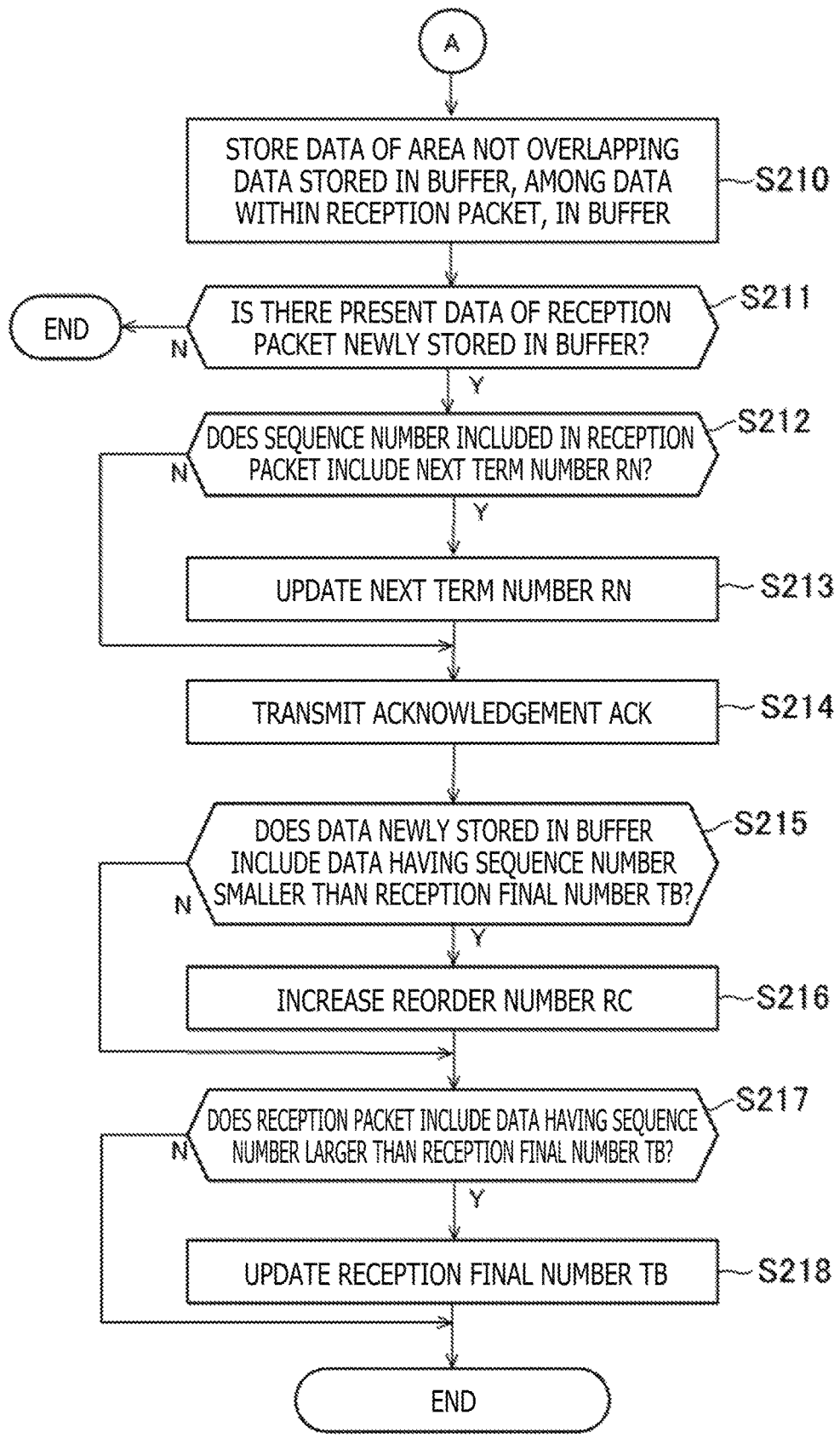
FIG. 5 is a flow chart depicting the example of the reception processing.

FIGS. 4 and 5 are flow charts depicting an example of reception processing in the second apparatus 20, and represent an example of processing of the reception section 56 and the network evaluating section 57. A program of the reception section 56 and the network evaluating section 57 is executed as a so-called protocol stack of a TCP layer. The flow charts depicted in FIGS. 4 and 5 are executed every time the reception section 56 receives the packet P during a period of time from establishment of the communication connection between a transmission port of the transmission section 51 and a reception port of the reception section 56 to the disconnection.

First, the reception section 56 acquires one reception packet PR as the packet P received at the reception port in accordance with the reception order (Step S201). The reception packet PR includes data, and also includes a head sequence number indicating at what number in the order the head of the data lies among the series of data transmitted through the communication connection, and a data size.

Next, it is decided whether or not the sequence number of the reception packet PR is larger than a reception final number TB (Step S202). Here, the reception final number TB is a sequence number indicating the final position among the data of the packets P which the reception section 56 has received through the communication connection until the present point in time, and corresponds to the identification value indicating the packet P located in the final position among the packets P which the reception section 56 has received through the communication connection until the present point in time. When the sequence number is larger than the reception final number TB (Y in Step S202), there is executed the processing in and after Step S203 as the processing in the case where there is no possibility of change in the reception order of the reception packet PR. Processing in the case where the sequence number is equal to or smaller than the reception final number TB (N in Step S202) will be described later.

In Step S203, the reception packet PR is stored in a buffer, and the reception final number TB is updated to the sequence number indicating the end of the data of the reception packet PR (S203). The buffer is an area of the storage section 12 in which the data of the received packet P is stored so as to be linked to the sequence number of the data.

Figure 6:
FIG. 6 is a diagram depicting an example of data of a packet stored in a buffer.
Figure 6:

FIG. 6 is a diagram depicting an example of the data stored in the buffer. FIG. 6 depicts a case where seven packets P including data having the respective sequence numbers of 1 to 1024, 1025 to 2048, 2049 to 3072, 4097 to 5120, 5121 to 6144, 7169 to 8192, and 8193 to 9216 are received and stored in the buffer. The data of the packet P, for example, is divided into units such as a byte or a word, and the sequence number is made to correspond to the data of the packet P for each unit. For this reason, the difference between the head sequence number in one packet P and the head sequence number of the next packet P corresponds to a data size.

In the case depicted in FIG. 6, the reception final number TB is 9216. The next term number RN is the sequence number indicating the next position of the data which have been continuously received. In the example of FIG. 6, since the data having the sequence numbers of 3073 to 4096 is not received, the next term number RN becomes 3073.

When the reception final number TB is updated, in the case where the head sequence number of the reception packet PR is equal to the next term number RN (Y in Step S204), the next term number RN is updated to the sequence number indicating the next sequence number of the end of the reception packet PR (the sequence number obtained by adding one to the end sequence number) (Step S205). In the case where the reception of the data of the packet P which is lost on the way is not waited for, but the packets P from the transmission section 51 are continuously received, the next term number RN and the head sequence number of the reception packet PR agree with each other.

Then, the reception section 56 transmits the acknowledgement ACK toward the transmission section 51 (Step S206).

Figure 7:
FIG. 7 is a diagram depicting an example of data and a reception packet stored in the buffer.

FIG. 7 is a diagram depicting an example of the data stored in the buffer and the reception packet PR. FIG. 7 depicts the example of a case where in the state of the buffer depicted in FIG. 6, the reception packet PR having the head sequence number larger than the reception final number TB is received. In this case, the reception final number TB is updated, but the next term number RN is not updated.

In the case where the head sequence number of the reception packet PR is not equal to the next term number RN (N in Step S205), there is executed processing in and after Step S210 as processing of the case where there is the possibility that change in the order of data occurs.

In Step S210, among the data included in the reception packet PR, the data of an area which does not overlap in position the data previously stored in the buffer is stored in the buffer (Step S210).

FIG. 8 is a diagram depicting another example of the data stored in the buffer and the reception packet PR. In the example of FIG. 8, the sequence numbers of the data included in the reception packet PR are 3073 to 5120 and, among the sequence numbers, the data having the sequence numbers of 4097 to 5120 overlap the data previously stored in the buffer. In this case, the data which is newly stored in the buffer is data having the sequence numbers of 3073 to 5120. It should be noted that the next term number RN and the reorder number RC are updated by the reception packet PR, the details of which will be described later.

When the data is stored in the buffer, the reception section 56 decides whether or not there is present the data of the reception packet PR newly stored in the buffer (Step S211). In the case where there is no data newly stored in the buffer (N in Step S211), the processing associated with this reception packet PR is ended.

FIG. 9 is a diagram depicting a further example of the data stored in the buffer and the reception packet PR. In the example of FIG. 9, since the positions (the positions indicated by the sequence numbers) of all the pieces of data included in the reception packet PR overlap those of the pieces of data which are previously received and stored in the buffer, there is no data which is to be newly stored in the buffer. Thus, the reception section 56 simply discards the reception packet PR and transmits no acknowledgement ACK. In addition, the reception packet PR whose data are all overlapping the data previously stored in the buffer is excluded from the target of the processing in the network evaluating section 57.

In the case where there is present the data newly stored in the buffer (Y in Step S211), when the sequence numbers for the data included in the reception packet PR include the next term number RN, in other words, when the next term number RN is equal to or larger than the head sequence number and is smaller than the end sequence number of the reception packet PR (the sum of the head sequence number and the data size) (Step S212), the reception section 56 updates the next term number RN (Step S213). Then, the reception section 56 transmits the acknowledgement ACK toward the transmission section 51 irrespective of the decision result in Step S212 (Step S214).

Figure 10:
FIG. 10 is a diagram depicting a further example of data and a reception packet stored in the buffer.

FIG. 10 is a diagram depicting a further example of the data stored in the buffer and the reception packet PR. In the example of FIG. 10, since the head sequence number 3073 of the reception packet PR, and the next term number RN are equal to each other and satisfy the condition of Step S211, the reception section 56 updates the next term number RN. The reception section 56 sets a next value (6145 in the example of FIG. 10) of the sequence number corresponding to an end of the pieces of data, which are continuously arranged from the next term number RN before the update, among the pieces of data stored in the buffer, to the new next term number RN.

Figure 11:
FIG. 11 is a diagram depicting a further example of data and a reception packet stored in the buffer.

FIG. 11 is a diagram depicting a further example of the data stored in the buffer and the reception packet PR. In the example of FIG. 11, the data of the reception packet PR does not overlap the data stored in the buffer. For this reason, the data of the reception packet PR is stored in the buffer. Meanwhile, since the reception packet PR does not include the data corresponding to the position of the next term number RN, the next term number RN is not updated.

Figure 12:
FIG. 12 is a diagram depicting a further example of data and a reception packet stored in the buffer.

FIG. 12 is a diagram depicting a further example of the data stored in the buffer and the reception packet PR. In the example of FIG. 12, in the data included in the reception packet PR, the head sequence number is equal to the next term number RN, and the end sequence number is equal to the reception final number TB. In such a case, the reception section 56 stores the data of the area having no data stored in the buffer, among the data of the reception packet PR, in the buffer and updates the next term number RN to the reception final number TB.

Moreover, in the case where there is present the data which is newly stored in the buffer (Y in Step S211), the network evaluating section 57 decides whether or not the data which is newly stored in the buffer includes the data having the sequence number smaller than the reception final number TB (Step S215). This decision is equivalent to the decision as to whether or not there is present the data, which is previously received to be stored in the buffer, located after the position indicated by the head sequence number of the reception packet PR. In the case where the data newly stored in the buffer includes the data having the sequence number smaller than the reception final number TB (Y in Step S215), the network evaluating section 57 increases the reorder number RC (Step S216).

Here, the network evaluating section 57, when increasing the reorder number RC, may add 1 to the reorder number RC, or may add a value according to a difference between the reception final number TB (corresponding to the identification value indicating the hindmost order among the packets P which have been received until the present point in time) and the sequence number of the reception packet PR to the reorder number RC. In the case of the latter, it is possible to evaluate that as the change in the order of the reception packets PR is larger, the state of the communication is more unstable.

Decision as to whether or not the reorder number RC is increased will now be more specifically described with reference to FIGS. 7 to 12. In the example of FIG. 7, since the sequence number of the reception packet PR is located after the reception final number TB, the network evaluating section 57 does not count the reorder number RC. As depicted in FIG. 9, also in the case where there is no data to be newly stored in the buffer, the network evaluating section 57 does not count the reorder number RC. On the other hand, as depicted in FIG. 8 and FIGS. 10 to 12, in the case where the reception packet PR includes the data having the sequence number before the reception final number TB, the network evaluating section 57 counts the reorder number RC.

In the case where the reorder number RC is counted, the reception packet PR received later is located ahead of the reception packet PR including the data having the final sequence number among the packets P received earlier, and thus the order of arrangement of the pieces of data and the order of reception of the pieces of data do not agree with each other. Such a case is a case where instability of the communication occurs and is close to the case where the packet loss occurs. The reorder number RC is counted, resulting in that it is possible to acquire an index having characteristics close to the packet loss.

In the case where the processing in Step S216 is executed, or it is decided in Step S215 that the condition is not satisfied (N in Step S215), the reception section 56 decides whether or not the reception packet PR includes the data having the sequence number larger than the reception final number TB, in other words, whether or not the end sequence number of the reception packet PR is larger than the reception final number TB (Step S217). In the case where the end sequence number of the reception packet PR is larger than the reception final number TB (Y in Step S217), the reception section 56 updates the reception final number TB to the end sequence number of the reception packet PR (Step S218). The updated reception final number TB is used when the processing in FIGS. 4 and 5 is executed for the subsequent reception packet PR.

Figure 13:
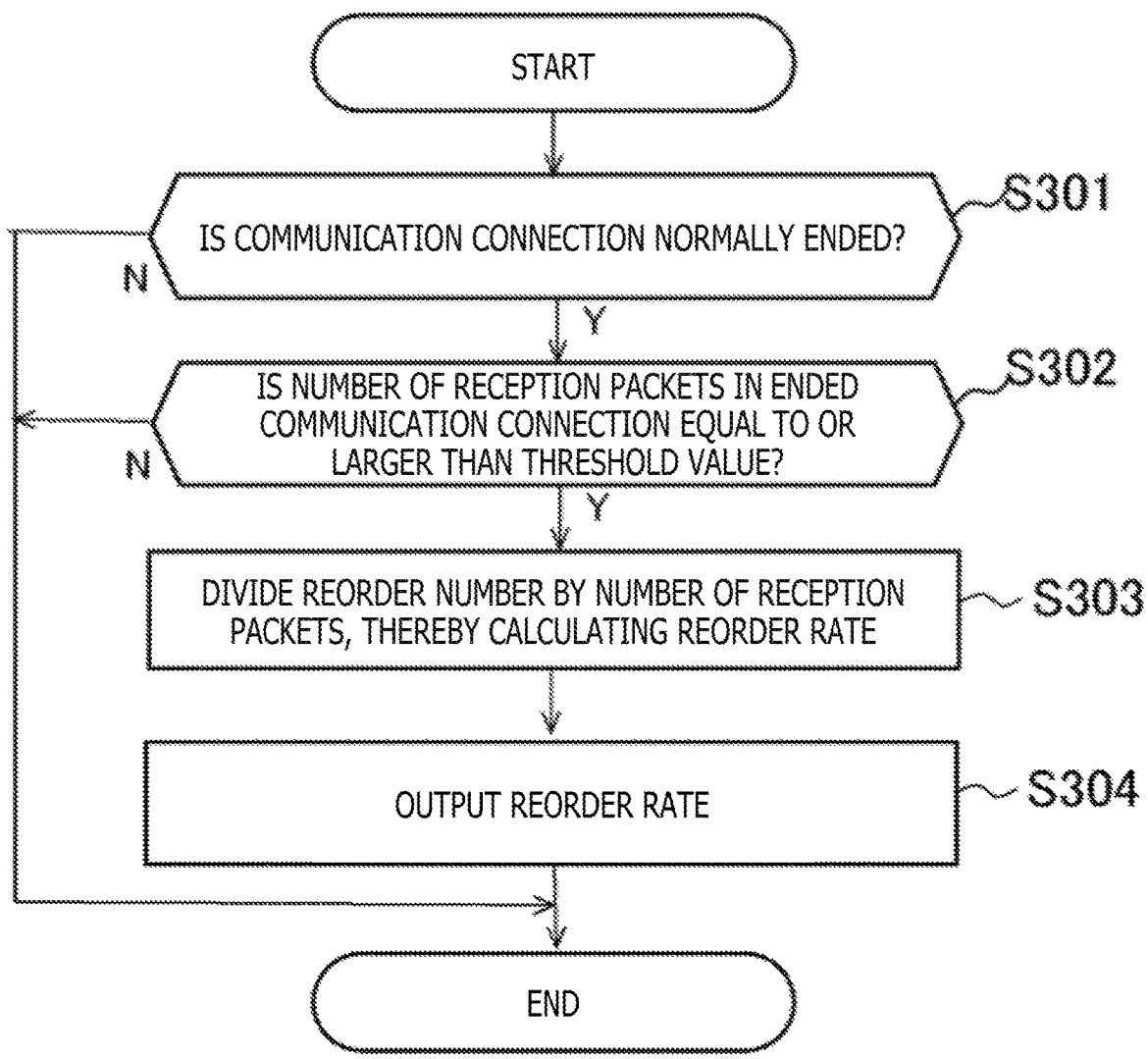
FIG. 13 is a flow chart depicting an example of processing for outputting a reorder rate.

Next, a description will be given with respect to the processing of calculating the reorder rate from the counted reorder number RC. FIG. 13 is a flow chart depicting an example of processing of outputting the reorder rate.

Although the processing depicted in FIG. 13 is executed every time one or a plurality of communication connections between the transmission section 51 and the reception section 56 are individually disconnected, the processing depicted in FIG. 13 may be executed collectively for a plurality of communication connections later. In this case, the reception section 56 may store the reorder number RC, the number of reception packets which will be described later, and the end situation of the communication connection in the storage section 12 at the time of the disconnection, and the network evaluating section 57 may execute the processing depicted in FIG. 13 by using the value stored in the storage section 12.

First, the network evaluating section 57 decides whether or not the communication connection is normally ended (Step S301). In the case where the communication connection is abnormally ended (N in Step S301), the network evaluating section 57 ends the processing without calculating the reorder rate. On the other hand, in the case where the communication connection is normally ended (Y in Step S301), the network evaluating section 57 decides whether or not the number of reception packets, as the number of packets P received during the ended communication connection, is equal to or larger than a threshold value (e.g., 300) (Step S302). In the case where the number of reception packets is smaller than the threshold value (N in Step S302), the network evaluating section 57 ends the processing without calculating the reorder rate. On the other hand, in the case where the number of reception packets is equal to or larger than the threshold value (Y in Step S302), the network evaluating section 57 divides the reorder number RC by the number of reception packets, thereby calculating the reorder rate (Step S303). Then, the network evaluating section 57 outputs the calculated reorder rate to the storage section 12 or the application (Step S304).

Since in a usual transmission/reception of packets P, it is difficult for the transmission section 51 and the reception section 56 to grasp the proper communication speed in the communication path, the state of the communication is easy to become unstable until the communication speed becomes stable to some degree in accordance with the actual situation. Accordingly, the reorder rate is obtained only for the communication connection with which the number of reception packets is equal to or larger than the threshold value, resulting in that the possibility that the abnormal value occurs can be reduced.

Here, instead of deciding whether or not the reorder rate is to be calculated depending on the number of reception packets, a predetermined number of packets P which are received from the start of the communication connection may be excluded from the target of the calculation of the reorder number RC and the reorder rate, and with respect to the remaining packets P, the reorder number RC and the reorder rate may be calculated. Specifically, in the case where the number of reception packets is equal to or smaller than a predetermined value, the network evaluating section 57 skips the processing of Steps S215 and S216. In addition, the network evaluating section 57 divides the reorder number RC by a value obtained by subtracting a predetermined value from the number of reception packets, thereby calculating the reorder rate in Step S303.

In the example of FIG. 13, the reorder rate is calculated only for the normally ended communication connection. This is also because in the case where the communication connection is abnormally ended, an abnormal value is calculated statistically in many cases. By excluding this case, the possibility that an abnormal value occurs can be reduced.

It should be noted that the network evaluating section 57 may be provided in an apparatus different from the second apparatus 20 receiving the data. In this case, instead of the reception section 56, a function of capturing the packet P which is transmitted to the second apparatus 20 may be provided, and the network evaluating section 57 may be mounted as a part of the function. Alternatively, the network evaluating section 57 may be mounted as a tool for reading out a plurality of packets P stored in the storage section 12 in the order of being previously acquired and received.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2018-192456 filed in the Japan Patent Office on Oct. 11, 2018, the entire content of which is hereby incorporated by reference.

What is claimed is:

1. A network evaluating apparatus comprising:
   an acquisition section acquiring a plurality of packets each of which includes an identification value indicating an order in accordance with which data is transmitted from a transmission source, the plurality of packets being received one by one; and
   an evaluation section that increases an evaluation value each time that the identification value included in a first packet as any one of the plurality of received packets indicates that the first packet is transmitted before a second packet received before the first packet,
   wherein the evaluation value indicates instability of a transmission and reception path,
   wherein the network evaluating apparatus terminates a connection with the transmission source if the evaluation value exceeds a predetermined threshold and establishes connection with an other apparatus having a same function as the transmission source.

2. The network evaluating apparatus according to claim 1, wherein the evaluation section calculates the evaluation value for each connection with the transmission source.

3. The network evaluating apparatus according to claim 2, wherein the evaluation section, in a case where the connection is ended, outputs the evaluation value.

4. The network evaluating apparatus according to claim 2, wherein the evaluation section, in a case where packets the number of which is larger than a predetermined number are received in the connection, outputs the evaluation value.

5. The network evaluating apparatus according to claim 2, wherein the evaluation section calculates the evaluation value with respect to a plurality of packets except for a predetermined number of packets from a head among the plurality of packets received in the connection.

6. The network evaluating apparatus according to claim 1, wherein the second packet includes an identification value indicating that the packet is last in order among the plurality of packets received before the first packet is received, and
   the evaluation section, in a case where the identification value included in the first packet indicates that the first packet is before the second packet in order, adds a value according to a difference between the identification value of the first packet and the identification value of the second packet to the evaluation value.

7. A network evaluating method comprising:
   acquiring a plurality of packets each of which includes an identification value indicating an order in accordance with which data is transmitted from a transmission source, the plurality of packets being received one by one; and
   increasing an evaluation value each time that the identification value included in a first packet as any one of the plurality of received packets indicates that the first packet is transmitted before a second packet received before the first packet,
   wherein the evaluation value indicates instability of a transmission and reception path,
   terminating a connection with the transmission source if the evaluation value exceeds a predetermined threshold; and establishing a connection with an other apparatus having a same function as the transmission source.

8. A non-transitory computer readable medium having stored thereon a program for a computer, the program comprising:
- by an acquisition section, acquiring a plurality of packets each of which includes an identification value indicating an order in accordance with which data is transmitted from a transmission source, the plurality of packets being received one by one; and
- by an evaluation section, increasing an evaluation value each time that the identification value included in a first packet as any one of the plurality of received packets indicates that the first packet is transmitted before a second packet received before the first packet,
- wherein the evaluation value indicates instability of a transmission and reception path,
- wherein the computer terminates a connection with the transmission source if the evaluation value exceeds a predetermined threshold and establishes connection with an other apparatus having a same function as the transmission source.

\* \* \* \* \*